US012607495B2

(12) United States Patent
Weidler et al.

(10) Patent No.: US 12,607,495 B2
(45) Date of Patent: Apr. 21, 2026

(54) SYSTEMS AND METHODS FOR SENSING LEVEL OF LIQUID WITHIN A CONTAINER

(71) Applicants: THE BOEING COMPANY, Arlington, VA (US); ADVANCED FIBREOPTICS ENGINEERING LTD, Carterton (GB)

(72) Inventors: John Alfred Weidler, McKinney, TX (US); Elaine Cheng Wright, Bothell, WA (US); Timothy James Wheeler, Greatworth (GB); John Everett Groat, Snohomish, WA (US); Christopher John Lewins, Carterton (GB); Mark Robert Johnson, London (GB); Patrick David Knowles, Oxford (GB); Marco Zanola, Wootton Boars Hill (GB)

(73) Assignees: The Boeing Compnay, Arlington, VA (US); Advance Fibreoptics Engineering Ltd, Carterton (GB)

( * ) Notice: Subject to any disclaimer, the term of this patent is extended or adjusted under 35 U.S.C. 154(b) by 188 days.

(21) Appl. No.: 18/479,935

(22) Filed: Oct. 3, 2023

(65) Prior Publication Data
US 2024/0385027 A1 Nov. 21, 2024

Related U.S. Application Data

(60) Provisional application No. 63/502,449, filed on May 16, 2023.

(51) Int. Cl.
*G01F 23/292* (2006.01)
*G01F 25/20* (2022.01)

(52) U.S. Cl.
CPC .......... *G01F 23/2924* (2013.01); *G01F 25/20* (2022.01)

(58) Field of Classification Search
CPC .... G01F 23/2924; G01F 25/20; G01F 23/292; G01F 23/2921; G01F 23/00; B60K 15/03;
(Continued)

(56) References Cited

U.S. PATENT DOCUMENTS 4,835,522 A * 5/1989 Andrejasich ............ G01M 3/32
340/521
5,613,398 A 3/1997 Lawson
(Continued)

FOREIGN PATENT DOCUMENTS

GB 2076960 12/1981
JP 2014109427 6/2014
(Continued)

OTHER PUBLICATIONS

Extended European Search Report for EP 24176344.0-1001, dated Oct. 11, 2024.
(Continued)

*Primary Examiner* — Georgia Y Epps
*Assistant Examiner* — Don J Williams
(74) *Attorney, Agent, or Firm* — Joseph M. Butscher; Carroll, Hoette & Butscher LLC

(57) ABSTRACT

A system and a method include a container configured to retain one or more liquids. A liquid level sensor is disposed within the container. The liquid level sensor includes a plurality of sensing elements configured to sense a level of the one or more liquids within the container. In at least one example, the sensing elements are optical fibers.

20 Claims, 4 Drawing Sheets

(58) Field of Classification Search
CPC ......... B60K 2015/03217; G01N 21/59; G01N 21/00

See application file for complete search history.

(56)                    References Cited

U.S. PATENT DOCUMENTS

| | | | |
|---|---|---|---|
| 7,473,897 B2 | 1/2009 | Braendle et al. | |
| 7,710,567 B1 * | 5/2010 | Mentzer | G01N 21/8507 |
| | | | 250/577 |
| 8,109,126 B1 | 2/2012 | Gibb | |
| 8,695,420 B1 * | 4/2014 | Korman | G01F 23/2921 |
| | | | 73/293 |
| 9,645,004 B2 | 5/2017 | Truong | |
| 10,845,231 B2 | 11/2020 | Truong | |
| 2003/0123827 A1 * | 7/2003 | Salerno | B82Y 20/00 |
| | | | 385/27 |
| 2005/0200480 A1 * | 9/2005 | Caras | G08B 25/003 |
| | | | 340/539.22 |
| 2005/0250849 A1 * | 11/2005 | Lorbert | A23K 20/142 |
| | | | 514/554 |

| | | | |
|---|---|---|---|
| 2007/0113646 A1 | 5/2007 | Maatuk | |
| 2012/0013889 A1 | 1/2012 | Heise | |
| 2013/0269832 A1 | 10/2013 | Gengerke | |
| 2014/0233042 A1 | 8/2014 | Klinec | |
| 2016/0266001 A1 * | 9/2016 | Mcnab | G01M 3/182 |
| 2017/0299416 A1 | 10/2017 | Rondano | |
| 2018/0066938 A1 | 3/2018 | Hu | |
| 2019/0293473 A1 | 9/2019 | Truong | |

FOREIGN PATENT DOCUMENTS

| | | | |
|---|---|---|---|
| JP | 7117800 | 8/2022 | |
| WO | WO 2017/194421 | 11/2017 | |
| WO | WO-2018045349 A1 * | 3/2018 | A61M 1/06 |
| WO | WO 2022/269361 | 12/2022 | |

OTHER PUBLICATIONS

Extended European Search Report for p. 2417634.9-1001, dated Oct. 18, 2024.

* cited by examiner

100

117 118 119

Control Unit

116

110

Container 104

112

108

Liquid level Sensor

114

102

108

106

114 122 126 110

120

124

108

122a

122

122b

104

112

103 102

122

106

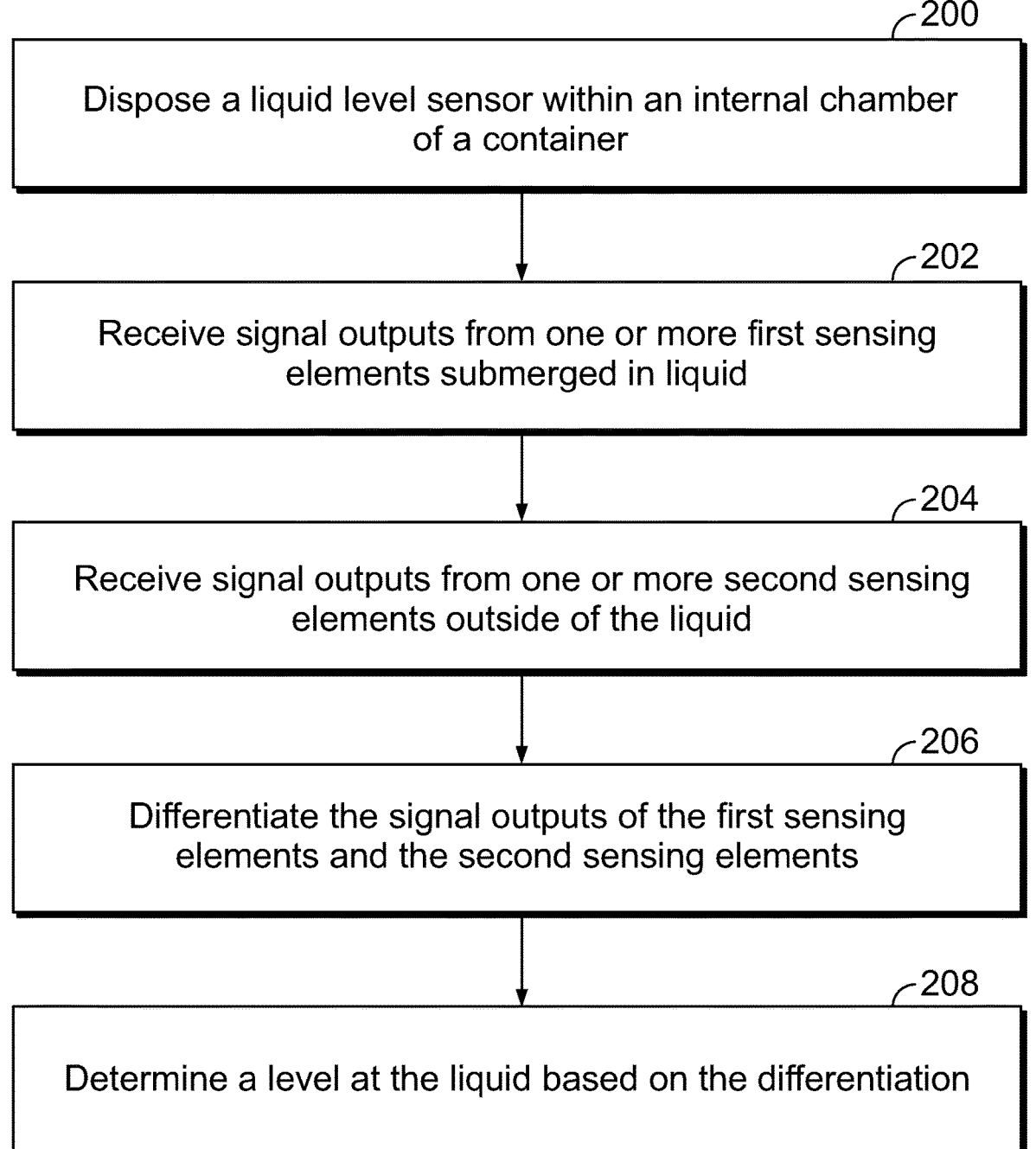

┌─200

Dispose a liquid level sensor within an internal chamber of a container

┌─202

Receive signal outputs from one or more first sensing elements submerged in liquid

┌─204

Receive signal outputs from one or more second sensing elements outside of the liquid

┌─206

Differentiate the signal outputs of the first sensing elements and the second sensing elements

┌─208

Determine a level at the liquid based on the differentiation

FIG. 6

SYSTEMS AND METHODS FOR SENSING LEVEL OF LIQUID WITHIN A CONTAINER

CROSS-REFERENCE TO RELATED APPLICATIONS

This application is a non-provisional conversion of, and claims priority to, U.S. Provisional Patent Application No. 63/502,449, filed May 16, 2023, which is incorporated by reference in its entirety.

FIELD OF THE DISCLOSURE

Examples of the present disclosure generally relate to systems and methods for sensing a level of a liquid within a container, such as liquid fuel within a fuel tank.

BACKGROUND OF THE DISCLOSURE

Various containers can be used to retain a liquid. For example, a reservoir can retain water. A fuel tank of a vehicle retains fuel.

In many industrial, commercial, and military applications, there is a need to determine the presence, and in particular the level, of a liquid inside a container. In some cases, the liquid(s) may be hazardous, such as volatile and/or combustible hydrocarbons. As an example, various vehicles, such as aircraft, cars, trucks, and the like include fuel tanks that retain fuel. As another example, oil refineries, fuel stations, airports, chemical treatment plants, and the like may include various tanks for storing fuel, other liquids, chemicals, or the like.

A known method for sensing a liquid level within a container includes using one or more electrical devices, such as capacitors, resistors, or ultrasonic transducers. However, such sensing devices introduce a potential source of ignition inside the container and may therefore be undesirable, and/or require careful design, management, and maintenance to ensure safe use.

SUMMARY OF THE DISCLOSURE

A need exists for a system and a method for effectively, efficiently, and safely sensing a level of liquid within a container, such as a fuel tank of a vehicle.

With that need in mind, certain examples of the present disclosure provide a system including a container configured to retain one or more liquids. One or more liquid level sensors is disposed (for example, installed) within the container. The liquid level sensor includes a plurality of sensing elements configured to sense a level of the one or more liquids within the container. In at least one example, the sensing elements are optical fibers.

In at least one example, the system also includes a multiplexer coupled to the liquid level sensor. As a further example, the multiplexer is within the container. The multiplexer can include a monolithic photonic integrated circuit.

In at least one example, a mirror is coupled to the multiplexer.

In at least one example, a temperature within the container is monitored through signals output by the multiplexer.

In at least one example, the system also includes a control unit in communication with the liquid level sensor. In at least one example, the control unit is outside of the container. The control unit is configured to determine the level of the one or more liquids within the container based on optical signals received from the plurality of sensing elements. The control unit can be further configured to determine different liquids within the container.

In at least one example, the control unit is further configured to operate a light source to emit light into the liquid level sensor(s).

The control unit can be further configured to determine health of the liquid level sensor based on power levels of signals received from the plurality of sensing elements.

In at least one example, the container is a fuel tank, and the one or more liquids include jet fuel.

The system can also include an optical line that communicatively couples to the liquid level sensor. As an example, the optical line is an optical fiber that extends through a portion of the container.

In at least one example, the plurality of sensing elements are arranged vertically along a height of the liquid level sensor.

Certain examples of the present disclosure provide a method including retaining one or more liquids within a container; and disposing (for example, installing) a liquid level sensor within the container. The liquid level sensor includes a plurality of sensing elements configured to sense a level of the one or more liquids within the container.

BRIEF DESCRIPTION OF THE DRAWINGS

FIG. 6 illustrates a flow chart of a method for sensing a level of a liquid within a container, according to an example of the present disclosure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
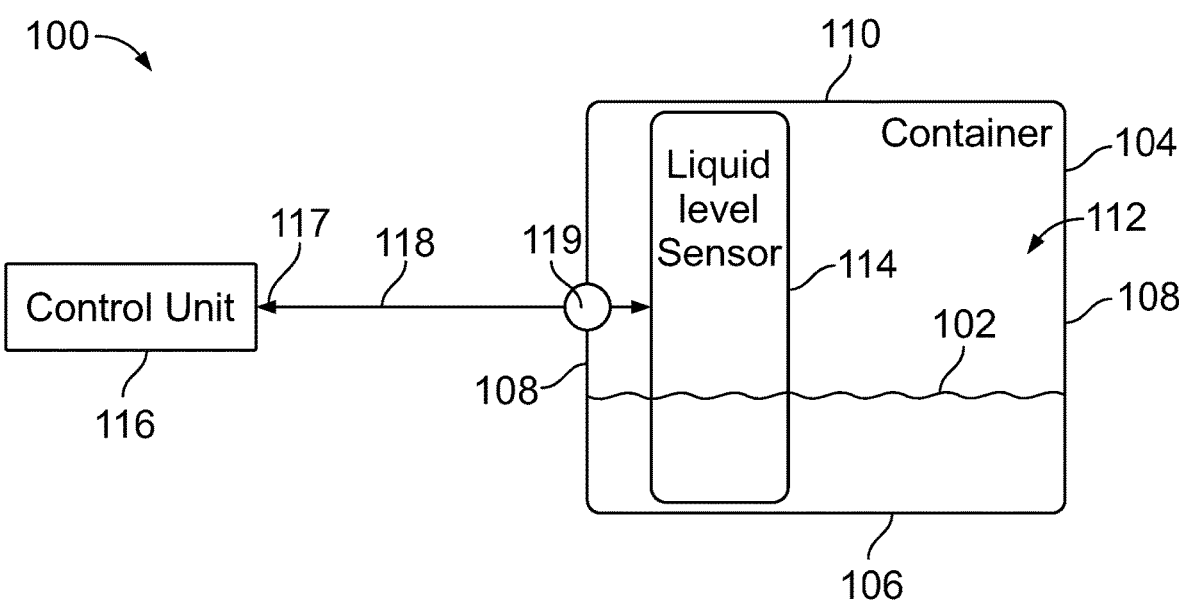
FIG. 1 illustrates a schematic diagram of a system for sensing a level of a liquid within a container, according to an example of the present disclosure.

FIG. 1 illustrates a schematic diagram of a system 100 for sensing a level of a liquid 102 within a container 104, according to an example of the present disclosure. The container 104 is a vessel, tank, reservoir, or the like that is configured to retain the liquid 102. The container 104 can be closed. Optionally, the container 104 can have an open top end, for example. In at least one example, the container 104 is a reservoir configured to retain the liquid 102, such as water. As another example, the container 104 is a fuel tank, such as of a vehicle, and the liquid 102 is a fuel for the vehicle. As another example, the container 104 is a tank configured to retain various other liquids, chemicals, and/or the like.

The container 104 includes a base 106, and one or more walls 108 upwardly extending from the base 106. In at least one example, a top wall 110 connects to the wall(s) 108 opposite from the base 106. The top wall 110 may not include any openings. Optionally, one or more openings may be formed in the top wall 110. As another example, the container 104 may not include the top wall 110.

An internal chamber 112 is defined between the base 106, the wall(s) 108, and the top wall 110. The liquid 102 is retained within the internal chamber 112.

A liquid level sensor 114, such as an optical probe, is disposed (for example, mounted, installed, attached, placed, and/or the like) within the internal chamber 112 of the container 104. As described herein, the liquid level sensor 114 is configured to sense or otherwise detect the level of the liquid 102 within the container 104. In at least one example, the liquid level sensor 114 is in communication with a control unit 116, such as through a wired or wireless connection. For example, an optical line 118 can extend through a portion of the wall(s) 108 and communicatively couple the liquid level sensor 114 to the control unit 116.

Figure 2:
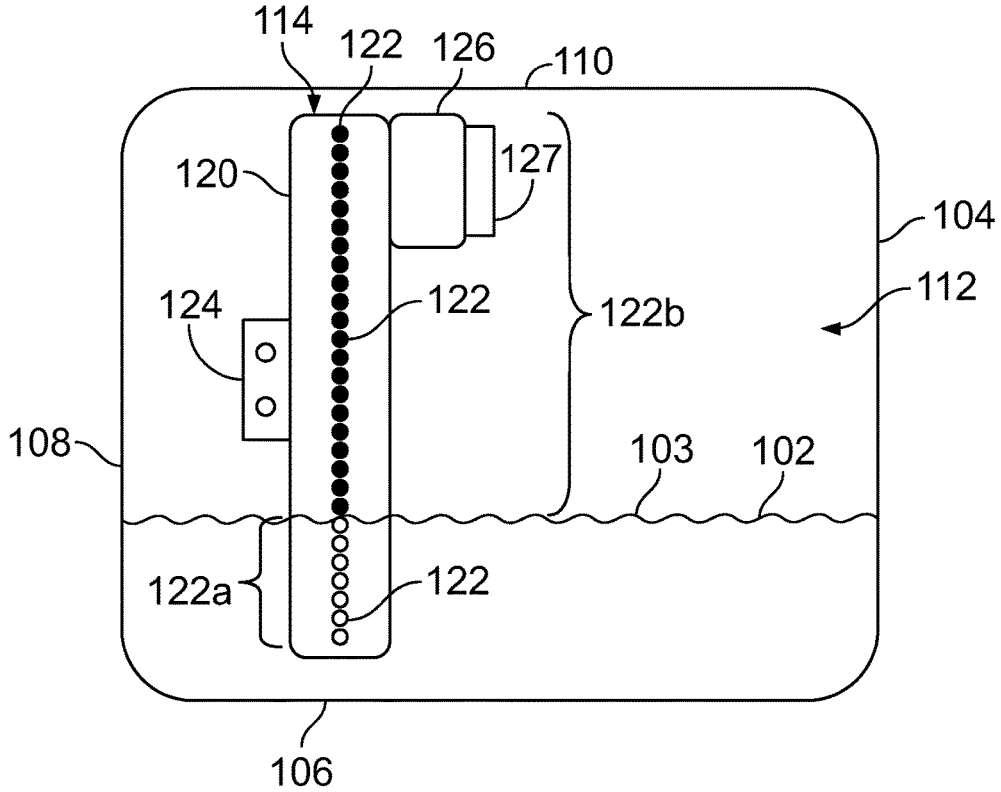
FIG. 2 illustrates a schematic of a liquid level sensor within an internal chamber of a container, according to an example of the present disclosure.

FIG. 2 illustrates a schematic of the liquid level sensor 114 within the internal chamber 112 of the container 104, according to an example of the present disclosure. The liquid level sensor 114 includes a housing 120 that retains a plurality of sensing elements 122. In at least one example, the sensing elements 122 are optical fibers, such as fiber optic strands or the like. The sensing elements 122 are arranged vertically along a height of the liquid level sensor 114. As such, the sensing elements 122 are disposed at different levels within the internal chamber 112 of the container 104.

A mounting bracket 124 can be used to secure the liquid level sensor 114 to a portion of the container 104. For example, the mounting bracket 124 can secure the liquid level sensor 114 to an internal surface of a wall 108, the base 106, and/or the top wall 110. In at least one example, a multiplexer 126 is coupled to the liquid level sensor 114. In at least one example, the liquid level sensor 114 is secured to the container 104 at a known location. As a further example, the liquid level sensor 114 can self-calibrate. In particular, the control unit 116 receives or is otherwise programmed with data regarding the known location of the liquid level sensor 114, and the location of each sensing element within the liquid level sensor 114. In this manner, the control unit 116 can then calibrate the liquid level sensor 114 and avoid calibration drift that may otherwise be experienced by non-discrete sensors.

As shown, the liquid 102 is at a level within the container 104 in which a subset 122a of the sensing elements 122 is submerged within the liquid 102, while a subset 122b of the sensing elements 122 is above an upper surface level 103 of the liquid 102. As described herein, the liquid level sensor 114 is configured to determine the level of the liquid 102 within the container 104 by detecting which of the sensing elements 122 are submerged.

Referring to FIGS. 1 and 2, in at least one example, one or more optical signals (such as broadband optical signals) are generated by the control unit 116, which can be an opto-electronics interrogation unit, and output to the liquid level sensor 114, such as an optical sensing probe. The control unit 116 can be outside the container 104. The control unit 116 can be in communication with the liquid level sensor 114 by the optical line 118, which can be or otherwise include one or more optical fibers. A liquid-tight feedthrough 119 can be used to secure the optical line 118 into and through the container 104. Optionally, the feedthrough 119 can be above the liquid, and may not be liquid-tight feedthrough.

In at least one example, the liquid level sensor 114 includes numerous sensing elements 122, such as optical fibers, which are used as sub-sensors. The multiplexer 126 is configured to split the optical signals from the optical line 118, which is a single IN/OUT optical fiber, into the multiple sensing elements 122. In at least one example, each sensing element returns a specific optical signal, whose intensity mainly depends on the presence or absence of the liquid 102 at each given location. The multiple optical signals travel back to the multiplexer 126, and through the optical line 118 to the control unit 116, which analyzes the signal(s) from each sensing element 122 to determine the level of the liquid 102 within the container 104.

The upper surface level 103 of the liquid 102 within the container 104 affects the number of sensing elements that reflect light back to the control unit 117. For example, the subset 122a of the sensing elements 122 reflects a reduced amount of light back to the control unit 116, while the subset 122b of the sensing elements 122 reflects an increased amount of light back to the control unit 116. As such, the control unit 116 determines the level 103 of the liquid 102 based on the light from the different sensing elements 122. For example, by monitoring the binary response of each individual sensing element 122, the control unit 116 determines the level of the liquid 102 within the container 104.

As described herein, the system 100 includes the container 104 configured to retain one or more liquids 102. The liquid level sensor 114 is disposed within the container 104 (such as within the internal chamber 112). The liquid level sensor 114 includes a plurality of sensing elements 122 configured to sense a level of the one or more liquids 102 within the container 104, such as based on optical qualities of the liquid(s) 102 in relation to optical qualities of vapor and/or gas, such as air. In at least one example, the sensing elements 122 are optical fibers. In at least one example, the system 100 also includes the multiplexer 126 coupled to the liquid level sensor 114. In at least one example, the system 100 also includes the control unit 116 in communication with the liquid level sensor 114. The control unit 116 is configured to determine the level of the one or more liquids 102 within the container 104 based on optical signals received from the plurality of sensing elements 122.

Figure 3:
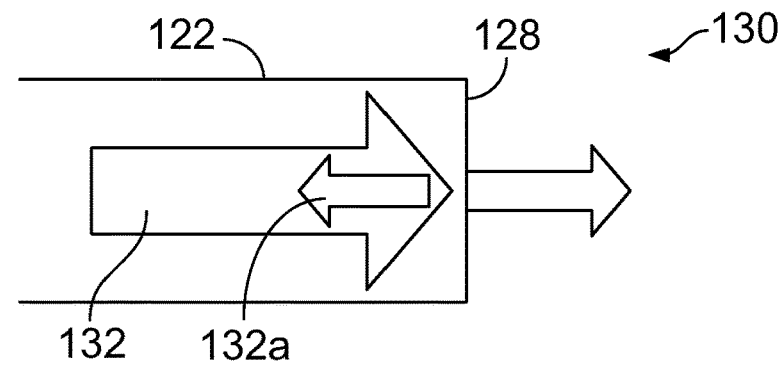
FIG. 3 illustrates a simplified view of an end of a sensing element within a gas, according to an example of the present disclosure.

FIG. 3 illustrates a simplified view of an end 128 of a sensing element 122 within a gas 130, according to an example of the present disclosure. As an example, the gas 130 is air. Referring to FIGS. 1-3, when light 132 output by the control unit 116 reaches each sensing element 122, a portion 132a of the light 132 is reflected back to the control unit 116 through the optical line 118. The amount of light 132 reflected back from each sensing element 122 depends on the geometrical shape of the sensing element 122, and on the refractive index of the liquid 102 being sensed. In at least one example, the sensing elements 122 can be made of conically shaped optical fibers. As another example, the sensing elements 122 can be made of flat cleaved optical fibers. Fresnel reflection equations can be used to calculate an amount of light back reflected by the sensing elements 122 as a function of their shape and of the refractive index of the liquid 102. For example, if a given sensing elements 122 is made of a flat-cleaved standard telecommunication fiber and it is exposed to air, a back reflection of about 3.37% of the incident light can be expected.

Figure 4:
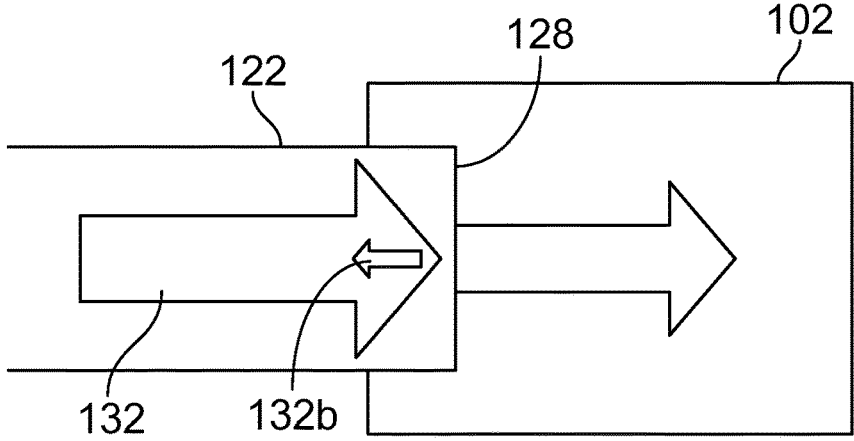
FIG. 4 illustrates a simplified view of the end of the sensing element within a liquid, according to an example of the present disclosure.

FIG. 4 illustrates a simplified view of the end 128 of the sensing element 122 within the liquid 102, according to an example of the present disclosure. Referring to FIGS. 1-4, when the sensing element 122 is exposed to a liquid having a refractive index that is higher than air, the portion 132*b* of the light 132 reflected back significantly decreases. For example, if the liquid 102 is water (n=1.33), the portion 132*b* that is back reflected decreases to ~0.19%. If the liquid 102 is jet fuel (n=1.44), the portion 132*b* that is back reflected decreases to ~0.001%. The control unit 116 detects the back reflected light, and is able to then determine that a sensing element 122 is either submerged in the liquid 102 or above the upper surface level 103 of the liquid 102. For example, if the control unit 116 detects the portion 132*a* of the light 132, the control unit 116 determines that the sensing element 122 is not submerged in the liquid 102. Conversely, if the control unit 116 detects the portion 132*b* of the light 132, the control unit 116 determines that the sensing element 122 is submerged in the liquid 102. In this manner, the liquid level sensor 114 is configured to sense the level of the liquid 102 within the container 104. By knowing the information about the presence or absence of the liquid 102 in relation to each sensing element 122, and the fixed location of each sensing element 122 within the container 104, the control unit 116 is able to determine the level of the liquid 102 within the container 104.

Additionally, the liquid level sensor 114 is self-calibrating. That is, the position of each sensing element 122 is known and fixed in relation to a geometry of the container 104. The position of each sensing element 122 remains fixed, and does not change, over time. Further, the intensity of the reflected signals can be linked to the refractive index of the liquid 102 being measured, giving the ability to identify the nature of the liquid inside the vessel (for example water or jet fuel). In this manner, the control unit 116 can further detect the presence of different liquids within the container 104.

The sensing elements 122 can be arranged in a multitude of orientations inside the container 104 in order to increase sensitivity to liquid sensing, improve ability to clear off liquid residuals, and maintain an acceptable shape and volume of the liquid level sensor 114. In an example, each sensing element 122 is oriented in a specific direction, for example upwards, downwards, or sideways. As another example, a plurality of different orientations of the sensing elements 122 can be used to increase the sensitivity across the height of the internal chamber 112.

In at least one example, the control unit 116 is coupled to a light source 117, and is configured to control operation of the light source 117. For example, the control unit 116 is configured to operate the light source 117 to emit broad band light into the optical line 118, such as one or more optical fibers, and subsequently into the liquid level sensor 114. The light source 117 can be an incandescent light source, a discharge lamp source, a supercontinuum laser source, one or more light emitting diodes (LEDs), a super luminescent diode, a wavelength-tunable laser source, or the like. The multiplexer 126 can be a wavelength-dependent multiplexer so that each sensing element 122 can be uniquely addressed by a different wavelength of light as analyzed by the control unit 116. Broadband light emission and wavelength-discernable light detection can be achieved through various methods, such as including wavelength sensitive devices or detector/source synchronization techniques.

A resolution of the liquid level sensor 114 can be directly linked to the number of sensing elements 122. In at least one example, the liquid level sensor 114 includes twenty, thirty, forty, fifty, one hundred, or more sensing elements 122. The multiplexer 126 is an optical device that is configured to split or recombine the optical signal output within the optical line 118 into several fibers, and vice versa. In at least one example, the multiplexer 126 is disposed within the internal chamber 112 of the container 104. As such, the optical line 118 can be a single optical fiber that is fed into the container 104, and coupled to the multiplexer 126, thereby allowing a large number of sensing elements 122 to be deployed inside the container 104.

In at least one example, the multiplexer 126 is or otherwise includes a monolithic photonic integrated circuit within the internal chamber 112. The multiplexer 126 can be in close proximity to the sensing elements 122, such as within six inches or less. The multiplexer 126 allows the incoming optical signal sent through the optical line 118 to be split between each sensing element 122 according to the wavelength of the incoming light. The light reflected from the end 128 of the sensing element 122 is then able to travel with minimal optical losses through the multiplexer 126 and back to the control unit 116, which then assigns the signal coming from each sensing element 122 depending on its wavelength. The multiplexer 126 is configured to split the incoming optical signal into a large number of output fibers, well in excess of 50, thereby allowing the optical line 118 to be or otherwise include a single optical fiber that extends into and through the container 104, which reduces overall weight and provides a simplified, efficient system.

As noted, in at least one example, the sensing elements 122 are optical liquid level sensors, such as optical fibers, which may not require electrical power to operate. The inherent safety of passive optical liquid level sensors allows them to be desirable in applications where the liquid 102 being measured is potentially dangerous, for example flammable or explosive. Such safety-critical sensors often require fail-safe functionalities, for example requiring the ability to detect any sensor malfunction that can lead to potentially dangerous erroneous liquid level sensing. Accordingly, the systems and methods described herein can provide information regarding the health and performance of the liquid level sensor 114.

In at least one example, the control unit 116 is further configured to determine health status (for example, operational or performance functional capacity) of the liquid level sensor 114 based on power levels of signals received from the plurality of sensing elements 122. For example, an output channel of the multiplexer 126 (such as a wavelength-dependent photonic integrated circuit multiplexer) can be directly coupled to a reflective component or surface, such as a mirror 127 with a known and fixed reflectance at the wavelengths of interest, and whose reflectance is not influenced by external factors such as conditions within the container 104. A portion of the optical signal that reaches such mirror 127 can be reflected back to the control unit 116. For example, when the control unit 116 receives a relevant optical signal within an acceptable power range, the control unit 116 determines that the health of the system 100 is acceptable, and all optical interconnections and transport fibers are working as expected. As another example, when the control unit 116 receives an optical signal having a power that is less than a predetermined expected magnitude, the control unit 116 then determines that the liquid level sensor 114 and/or the optical line 118 may be in need of maintenance. As another example, when the control unit 116 does not receive an optical signal, the control unit 116 may then determine that the liquid level sensor 114 and/or the optical line 118 is malfunctioning.

As noted, the multiplexer 126 and its fixed reflection reference channel are located within the internal chamber 112 of the container 104 in close proximity to (such as within six inches or less) the sensing elements 122. As such, any signal disruption that may occur is highly likely to affect both the sensing elements 122, and the (optional) fixed reflection mirror 127. In contrast, a control channel located far away from the sensing elements 122 would likely miss faults that occur beyond its location in the optical propagation link.

In at least one example, the control unit 116 is configured to monitor the optical power from each sensing element 122, and compare it to an optical power as returned by a fixed-reflection reference channel. The control unit 116 can calculate a theoretical Fresnel reflection for each sensing element 122, and adjust such reflection by a factor directly proportional to the power received from the reference channel. In the event that the optical power received from any given sensing element 122 is lower than expected, control unit 116 identifies such sensing element 122. In this manner, the control unit 116 is able to differentiate from potentially faulty sensing elements 122, in contrast to sensing elements 122 reflecting back a portion of light indicating the presence of liquid. In at least one example, the control unit 116 can be in communication with a user interface, which can include an electronic display, and automatically generate status and service reports based on the health of the liquid level sensor 114.

In at least one example, a temperature within the container 104 (such of the liquid and/or air) is monitored through signals output by the multiplexer 126. For example, the multiplexer 126 can be a monolithic photonic integrated circuit multiplexer, which has a high temperature sensitivity. The multiplexer 126 uses coherent light interference to split the incoming optical signal into various output channels depending on wavelength. The temperature of the environment surrounding the multiplexer 126 affects the wavelength response, thereby creating a red-shift for increasing temperatures, and a blue shift for decreasing temperatures. In at least one example, such shift can be exploited to directly relate the wavelength of the light reflected by the fixed reflector of reference channel to the temperature of the surrounding environment, such as of the liquid or the air within the container 104. For example, as temperature increases, the wavelength of the light reflected by the reference channel increases (for example, the red shift), while the wavelength decreases for decreasing temperatures (for example, the blue shift). The interferometric nature of the multiplexer 126 means that very small variations of temperature lead to significant wavelength shifts, for example in the order of several pm/K, compatible with the resolution of the optical components used in relation to the control unit 116. The temperature measurement can be further refined with the use of calibration routines and exploited to precisely monitor the temperature of the environment inside the container 104, for example to avoid the development of potentially explosive conditions, to avoid freezing conditions or, if multiple sensors are used, to monitor the temperature stratification of the liquid inside the container 104. In different examples, the liquid level sensor 114 can be configured so that multiplexers 126 are disposed at different heights for different probes, giving more distributed temperature sensing points within the container 104. The temperature sensing capability, together with the other health monitoring capabilities, allows the control unit 116 to provide information regarding the health and operating environment of the liquid level sensor 114, further increasing its resilience and reliability in safety critical applications.

In at least one example, the temperature reading returned by the control unit 116 can be connected in a feedback loop with temperature control devices (such as heat exchangers), allowing an active temperature control of the liquid inside the vessel without additional sensors.

In at least one example, the ability of the control unit 116 to estimate or otherwise determine an expected optical power being returned by each sensing element 122 can be further exploited to provide additional information regarding the liquid 102. As such, the control unit 116 can determine the nature of the liquid 102 being sensed, and avoid overestimating the level of the liquid 102 in response to an undesired mixing with liquid contaminants. For example, due to the large difference in permittivity for water and jet fuel, capacitance liquid level sensors may mistake 1 cm of water as several tens of cm of jet fuel, if compensating sensors are not used.

In at least one example, calibration routines of the system 100 may be employed to further increase the accuracy of the measurement. Even without precise calibration routines, the inherent digital behavior of the sensing elements 122 as optical sensors (that is, high reflection when sensing elements 122 are immersed in air, low reflection when in liquid) avoids overestimations of the liquid of interest, for example jet fuel, in case of undesired contamination, such as with water. Due to the discrete and digital nature of the sensing elements 122, and by only using a predetermined threshold to distinguish the expected light reflected from sensing elements 122 in air in contrast to the sensing elements 122 in liquid 102, the control unit 116 is able to sense the true upper surface level 103 of the liquid 102 within the container 104 without the need of compensators, thereby avoiding overestimations.

In at least one example, the control unit 116 is configured to measure the Fresnel reflection coming from the liquid 102. Once the optical power reflected at the end 128 of each sensing element 122 is weighted against the expected reflected power provided by the reference channel, the control unit 116 is able to compare the Fresnel reflection received from each sensing elements 122 with the expected reflection typical of different liquids, for example water or jet fuel. By repeating this measurement for all the sensing elements 122, the control unit 116 is able to determine a stratification of different liquids within the container 104, and account for the height of a particular desired liquid. For example, the control unit 116 can identify a layer of water at the bottom of the container 104 containing a lighter liquid such as jet fuel and exclude such liquid from the calculation of the level of another liquid of interest.

In at least one example, at least one sensing element 122 can be disposed at a position within the internal chamber 112 that is constantly immersed in the liquid 102. Such sensing element 122 can be fully dedicated to measuring the Fresnel reflection in relation to the liquid 102.

In at least one example, the control unit 116 is configured to discern between different types of liquid to identify ice droplet formation at portions of the sensing elements 122, such as the ends 128, thereby further increasing system health monitoring. Ice droplet formation can reduce sensing sensitivity inside the container 104. The Fresnel reflection from ice is different from the expected reflection from air or fuel, for example, thereby allowing the control unit 116 to discard outputs from sensing elements 122 that mistake ice droplets as fuel.

Figure 5:
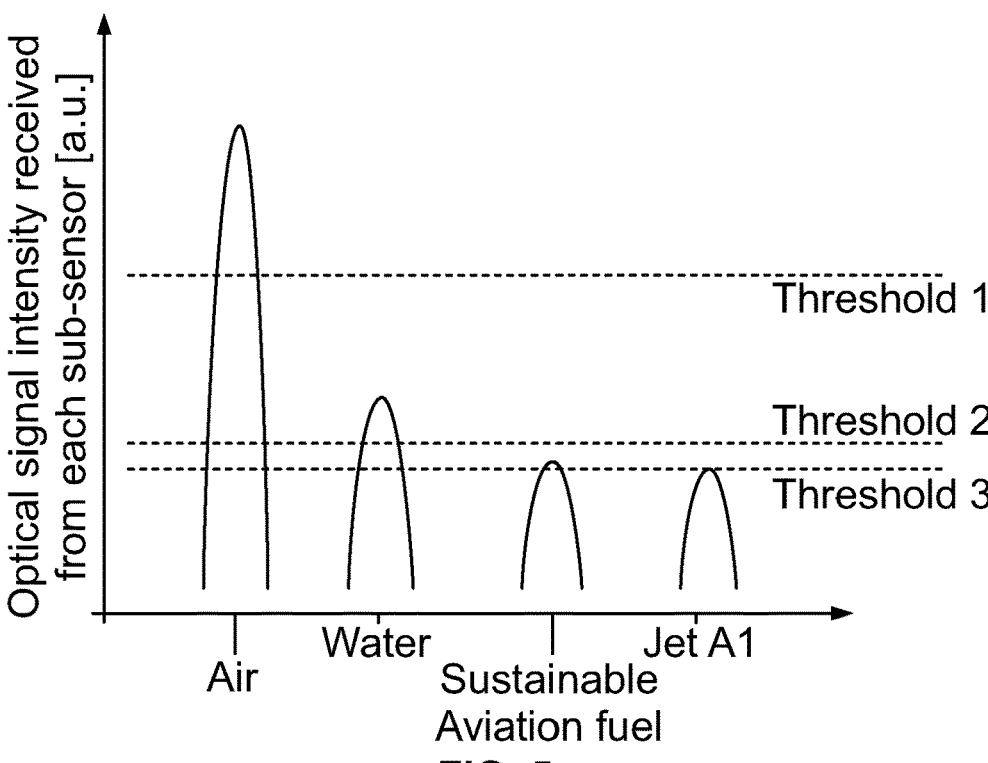
FIG. 5 illustrates a graph of optical signals expected from a sensing element in relation to different liquids, according to an example of the present disclosure.

FIG. 5 illustrates a graph of optical signals expected from a sensing element 122 in relation to different liquids, according to an example of the present disclosure. Referring to FIGS. 1-5, the digital nature of the system 100 described herein can be used to standardize response irrespective of the liquid being sensed. The magnitude of the Fresnel reflections at the ends 128 of the sensing elements 122 depends on the refractive index of the liquid 102 being sensed. In at least one example, a signal threshold can be set to separate the readings from sensing elements 122 exposed to air and sensing elements 122 exposed to liquid 102. Depending on the value assigned to such threshold, the control unit 116 can be configured to treat equally the responses coming from different types of liquids, for example different types of jet fuels used in an aircraft tank, but still provide a clear contrast with the response of sensing elements 122 exposed to air or water. Various jet fuels currently used or expected to be used in the future, for example but not limited to Jet-A1, JP-5 and SAF, have remarkably similar optical characteristics, for example refractive index, especially when compared to air. A refractive index of such different fuels is in the region of n=1.43+/−0.06 at any expected operating temperature. In contrast, the refractive index of air is n=1, thereby proving a clear and discernible sensor response between air and any of the above-mentioned jet fuels, and therefore allowing the control unit 116 to be agnostic to the type of jet fuel present in the container 104. The control unit 116 can further extend such concept to dynamically move a decision threshold (for example, Threshold 3, as shown in FIG. 5) and identify the specific type of fuel in the container 104.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 116 may be or include one or more processors that are configured to control operation, as described herein.

The control unit 116 is configured to execute a set of instructions that are stored in one or more data storage units or elements (such as one or more memories), in order to process data. For example, the control unit 116 may include or be coupled to one or more memories. The data storage units may also store data or other information as desired or needed. The data storage units may be in the form of an information source or a physical memory element within a processing machine.

The set of instructions may include various commands that instruct the control unit 116 as a processing machine to perform specific operations such as the methods and processes of the various examples of the subject matter described herein. The set of instructions may be in the form of a software program. The software may be in various forms such as system software or application software.

Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 116. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 116 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and nonvolatile RAM (NVRAM) memory. The above data storage unit types are exemplary only, and are thus not limiting as to the types of memory usable for storage of a computer program.

FIG. 6 illustrates a flow chart of a method for sensing a level of a liquid within a container, according to an example of the present disclosure. Referring to FIGS. 1-6, at 200, the liquid level sensor 114 having the sensing elements 122 is disposed within the internal chamber 112 of the container 104. At 202, the control unit 116 receives signal outputs (such as optical signals) from one or more first sensing elements 122 submerged in the liquid 102 (for example, the subset 122*a*). At 204, the control unit 116 receives signal outputs from one or more second sensing elements 122 outside of the liquid 102 (for example, the subset 122*b* surrounded by air). Steps 202 and 204 can occur concurrently. At 206, the control unit 116 differentiates the signal outputs of the first sensing elements 122 and the second sensing elements 122. At 208, the control unit 116 determines the level 103 of the liquid 102 within the container 104 based on the difference between the signal outputs from the first sensing element(s) 122 and the second sensing element(s) 122.

Figure 7:
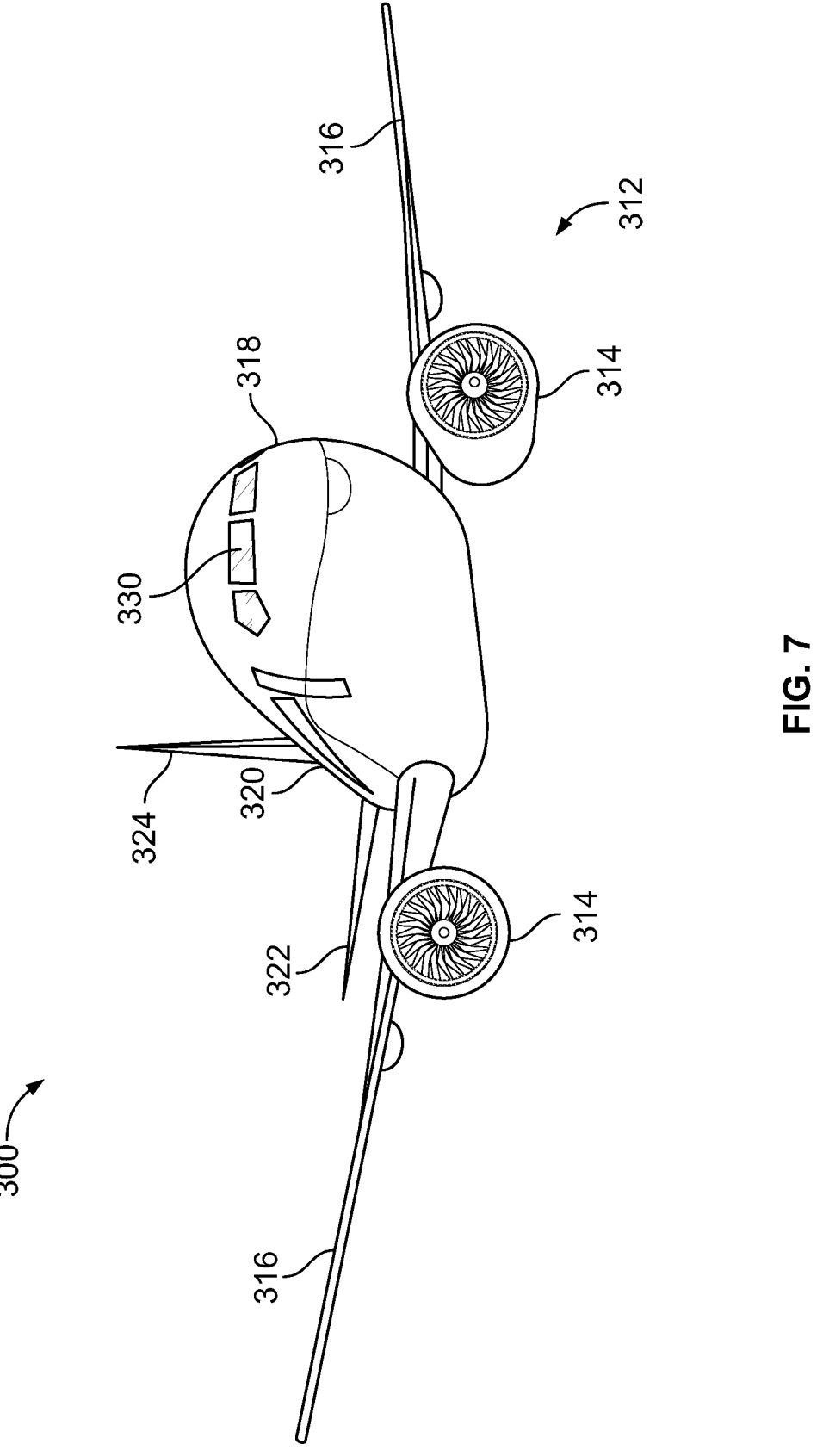
FIG. 7 illustrates a perspective front view of an aircraft, according to an example of the present disclosure.

FIG. 7 illustrates a perspective front view of an aircraft 300, according to an example of the present disclosure. The aircraft 300 includes a propulsion system 312 that includes engines 314, for example. Optionally, the propulsion system 312 may include more engines 314 than shown. The engines 314 are carried by wings 316 of the aircraft 300. In other examples, the engines 314 may be carried by a fuselage 318 and/or an empennage 320. The empennage 320 may also support horizontal stabilizers 322 and a vertical stabilizer

324. The fuselage 318 of the aircraft 300 defines an internal cabin 330, which includes a flight deck or cockpit, one or more work sections (for example, galleys, personnel carry-on baggage areas, and the like), one or more passenger sections (for example, first class, business class, and coach sections), one or more lavatories, and/or the like. Referring to FIGS. 1-7, the aircraft 300 includes one or more containers that retain a liquid. For example, the aircraft 300 includes a fuel tank that retains jet fuel. Examples of the present disclosure are used to detect the level(s) of liquid(s) within the container(s), such as the level of jet fuel within the fuel tank.

FIG. 7 shows an example of an aircraft 300. It is to be understood that the aircraft 300 can be sized, shaped, and configured differently than shown in FIG. 7. Optionally, examples of the present disclosure can be used with various other vehicles. For example, instead of an aircraft, the vehicle can be a land-based vehicle, such as an automobile, a bus, a train car, or the like. As another example, the vehicle can be a watercraft. As another example, the vehicle can be a spacecraft. Optionally, examples of the present disclosure can be used with fixed structures, such as residential or commercial buildings.

Further, the disclosure comprises examples according to the following clauses:

Clause 1. A system comprising:

a container configured to retain one or more liquids; and a liquid level sensor disposed within the container, wherein the liquid level sensor comprises a plurality of sensing elements configured to sense a level of the one or more liquids within the container.

Clause 2. The system of Clause 1, wherein the sensing elements are optical fibers.

Clause 3. The system of Clauses 1 or 2, further comprising a multiplexer coupled to the liquid level sensor.

Clause 4. The system of Clause 3, wherein the multiplexer is within the container.

Clause 5. The system of Clauses 3 or 4, wherein the multiplexer comprises a monolithic photonic integrated circuit.

Clause 6. The system of any of Clauses 3-5, further comprising a mirror coupled to the multiplexer.

Clause 7. The system of any of Clauses 3-6, wherein a temperature within the container is monitored through signals output by the multiplexer.

Clause 8. The system of any of Clauses 1-7, further comprising a control unit in communication with the liquid level sensor, wherein the control unit is configured to determine the level of the one or more liquids within the container based on optical signals received from the plurality of sensing elements.

Clause 9. The system of Clause 8, wherein the control unit is further configured to determine different liquids within the container.

Clause 10. The system of Clauses 8 or 9, further comprising a light source, wherein the control unit is further configured to operate the light source to emit light into the liquid level sensor.

Clause 11. The system of any of Clauses 8-10, wherein the control unit is further configured to determine health of the liquid level sensor based on power levels of signals received from the plurality of sensing elements (and optionally from a fixed reflection channel).

Clause 12. The system of any of Clauses 1-11, wherein the container is a fuel tank, and the one or more liquids comprise jet fuel.

Clause 13. The system of any of Clauses 1-12, further comprising an optical line that communicatively couples to the liquid level sensor.

Clause 14. The system of Clause 13, wherein the optical line is an optical fiber that extends through a portion of the container.

Clause 15. The system of any of Clauses 1-14, wherein the plurality of sensing elements are arranged vertically along a height of the liquid level sensor.

Clause 16. A method comprising:

retaining one or more liquids within a container; and disposing a liquid level sensor within the container, wherein the liquid level sensor comprises a plurality of sensing elements configured to sense a level of the one or more liquids within the container.

Clause 17. The method of Clause 16, wherein the sensing elements are optical fibers.

Clause 18. The method of Clauses 16 or 17, further comprising coupling a multiplexer to the liquid level sensor.

Clause 19. The method of any of Clauses 16-18, further comprising disposing the multiplexer within the container.

Clause 20. The method of Clauses 18 or 19, wherein the multiplexer comprises a monolithic photonic integrated circuit.

Clause 21. The method of any of Clauses 18-20, further comprising coupling a mirror to the multiplexer.

Clause 22. The method of any of Clauses 18-21, further comprising monitoring a temperature within the container through signals output by the multiplexer.

Clause 23. The method of any of Clauses 16-22, further comprising determining, by a control unit in communication with the liquid level sensor, the level of the one or more liquids within the container based on optical signals received from the plurality of sensing elements.

Clause 24. The method of Clause 23, further comprising determining, by the control unit, different liquids within the container.

Clause 25. The method of Clauses 23 or 24, further comprising operating, by the control unit, a light source to emit light into the liquid level sensor.

Clause 26. The method of any of Clauses 23-25, further comprising determining, by the control unit, health of the liquid level sensor based on power levels of signals received from the plurality of sensing elements (and from a fixed reflection channel).

Clause 27. The method of any of Clauses 16-26, wherein the container is a fuel tank, and the one or more liquids comprise jet fuel.

Clause 28. The method of any of Clauses 16-27, further comprising communicatively coupling an optical line to the liquid level sensor.

Clause 29. The method of Clause 28, wherein the optical line is an optical fiber that extends through a portion of the container.

Clause 30. The method of any of Clauses 16-29, wherein the plurality of sensing elements are arranged vertically along a height of the liquid level sensor.

Clause 31. A system comprising:

a container configured to retain one or more liquids;

a liquid level sensor disposed within the container, wherein the liquid level sensor comprises a plurality of sensing elements configured to sense a level of the one or more liquids within the container, and wherein the sensing elements are optical fibers;

a multiplexer coupled to the liquid level sensor;

a mirror coupled to the multiplexer;

a control unit in communication with the liquid level sensor, wherein the control unit is configured to determine the level of the one or more liquids within the container based on optical signals received from the plurality of sensing elements;

a light source, wherein the control unit is further configured to operate the light source to emit light into the liquid level sensor; and an optical line that communicatively couples the control unit to the multiplexer, wherein the optical line is an optical fiber that extends through a portion of the container.

Clause 32. The system of Clause 31, wherein the multiplexer comprises a monolithic photonic integrated circuit.

Clause 33. The system of Clauses 31 or 32, wherein a temperature within the container is monitored through signals output by the multiplexer.

Clause 34. The system of any of Clauses 31-33, wherein the control unit is further configured to determine different liquids within the container.

Clause 35. The system of any of Clauses 31-34, wherein the control unit is further configured to determine health of the liquid level sensor based on power levels of signals received from the plurality of sensing elements (and from a fixed reflection channel).

As described herein, examples of the present disclosure systems and methods for effectively, efficiently, and safely sensing a level of liquid within a container, such as a fuel tank of a vehicle.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a container configured to retain one or more liquids; and
a liquid level sensor disposed within the container, wherein the liquid level sensor comprises sensing elements configured to sense a level of the one or more liquids within the container,
wherein each of the sensing elements is configured to output a specific optical signal, and
wherein the level of the one or more liquids is determined based on the specific optical signal from each of the sensing elements.

2. The system of claim 1, wherein the sensing elements are optical fibers.

3. The system of claim 1, further comprising a multiplexer coupled to the liquid level sensor.

4. The system of claim 3, wherein the multiplexer is within the container.

5. The system of claim 3, wherein the multiplexer comprises a monolithic photonic integrated circuit.

6. The system of claim 3, further comprising a mirror coupled to the multiplexer.

7. The system of claim 3, wherein a temperature within the container is monitored through signals output by the multiplexer.

8. The system of claim 1, further comprising a control unit in communication with the liquid level sensor, wherein the control unit is configured to determine the level of the one or more liquids within the container based on the specific optical signals received from the sensing elements.

9. The system of claim 8, wherein the control unit is further configured to determine different liquids within the container.

10. The system of claim 8, further comprising a light source, wherein the control unit is further configured to operate the light source to emit light into the liquid level sensor.

11. The system of claim 8, wherein the control unit is further configured to determine health of the liquid level sensor based on power levels of signals received from the sensing elements and from a fixed reflection channel.

12. The system of claim 1, wherein the container is a fuel tank, and the one or more liquids comprise jet fuel.

13. The system of claim 1, further comprising an optical line that communicatively couples to the liquid level sensor.

14. The system of claim 13, wherein the optical line is an optical fiber that extends through a portion of the container.

15. The system of claim 1, wherein the sensing elements are arranged vertically along a height of the liquid level sensor.

16. The system of claim 1, wherein the liquid level sensor is configured to be self-calibrated.

17. A method comprising:

retaining one or more liquids within a container;

disposing a liquid level sensor within the container, wherein the liquid level sensor comprises a sensing elements configured to sense a level of the one or more liquids within the container;

outputting a specific optical signal from each of the sensing elements; and determining the level of the one or more liquids based on the specific optical signal from each of the sensing elements.

18. The method of claim 17, further comprising:

coupling a multiplexer to the liquid level sensor proximate to the sensing elements, wherein the multiplexer comprises a monolithic photonic integrated circuit;

disposing the multiplexer within the container;

coupling a mirror to the multiplexer; and monitoring a temperature within the container through signals output by the multiplexer.

19. The method of claim 17, further comprising:

determining, by a control unit in communication with the liquid level sensor, the level of the one or more liquids within the container based on the specific optical signals received from the sensing elements;

determining, by the control unit, different liquids within the container;

operating, by the control unit, a light source to emit light into the liquid level sensor; and determining, by the control unit, health of the liquid level sensor based on power levels of signals received from the plurality of sensing elements.

20. A system comprising:

a container configured to retain one or more liquids;

a liquid level sensor disposed within the container, wherein the liquid level sensor comprises sensing elements configured to sense a level of the one or more liquids within the container, and wherein the sensing elements are optical fibers, wherein each of the sensing elements is configured to output a specific optical signal, and wherein the level of the one or more liquids is determined based on the specific optical signals from the sensing elements;

a multiplexer coupled to the liquid level sensor;

a reflective surface coupled to one or more channels of the multiplexer;

a control unit in communication with the liquid level sensor, wherein the control unit is configured to determine the level of the one or more liquids within the container based on the specific optical signals received from each of the sensing elements;

a light source, wherein the control unit is further configured to operate the light source to emit light into the liquid level sensor; and an optical line that communicatively couples the control unit to the multiplexer, wherein the optical line is an optical fiber that extends through a portion of the container.

* * * * *